M. H. P. ARCHER.
MOWING MACHINE.
APPLICATION FILED OCT. 24, 1919.
1,348,685.
Patented Aug. 3, 1920.
2 SHEETS—SHEET 2.
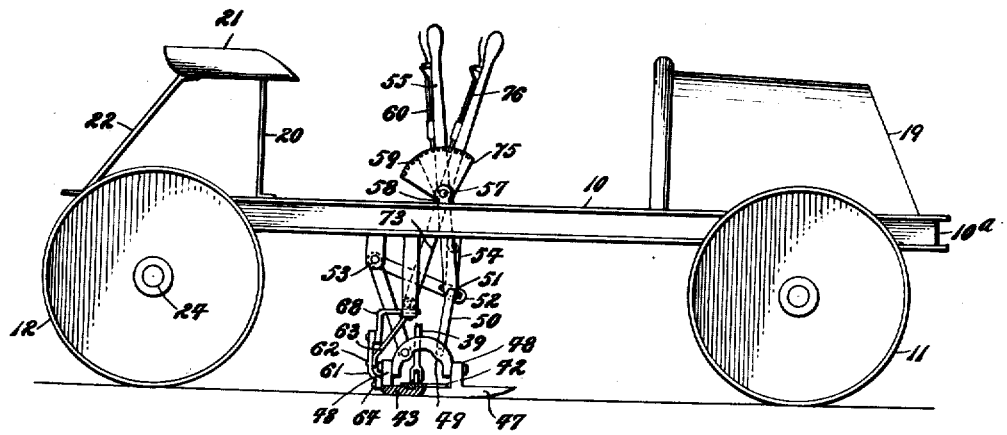
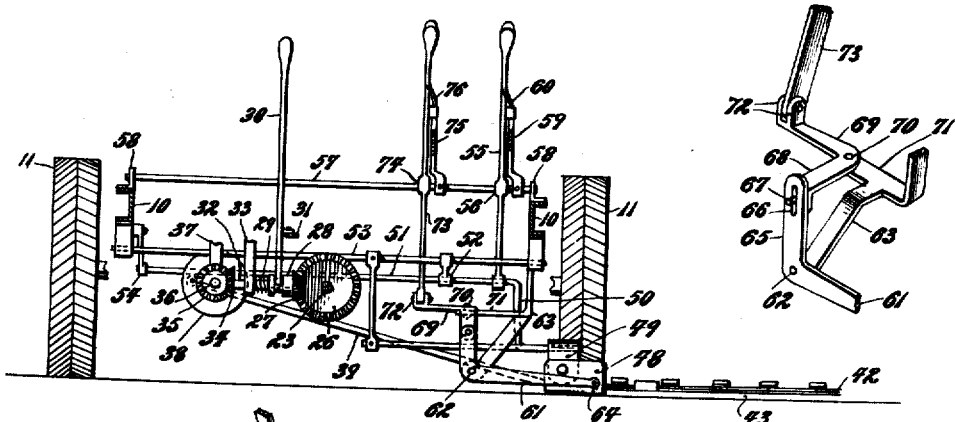
WITNESS:
Alfred T. Bratton
Marmaduke H. P. Archer
INVENTOR.
BY
Victor J. Evans
ATTORNEY.

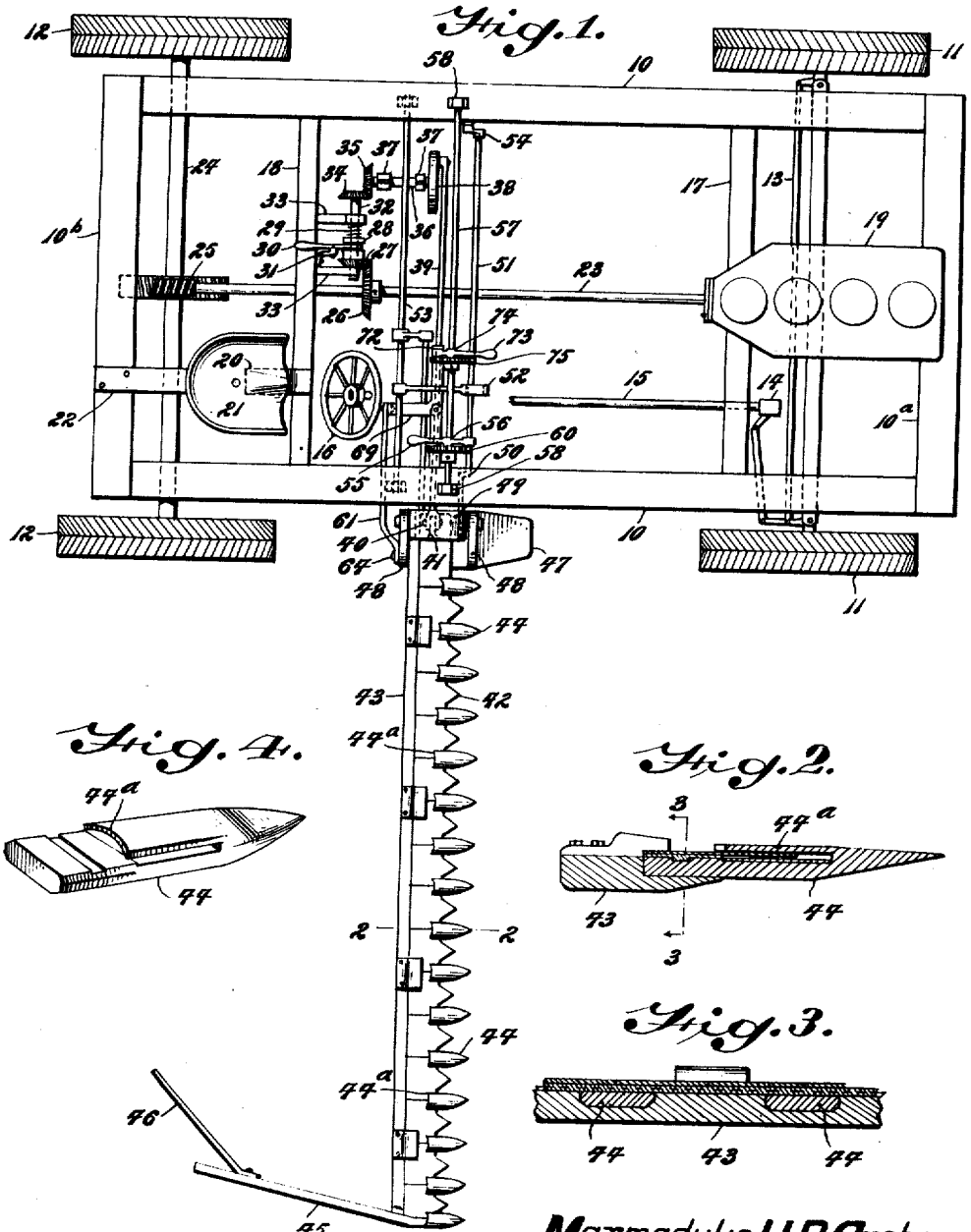

UNITED STATES PATENT OFFICE.

MARMADUKE H. P. ARCHER, OF CONSHOHOCKEN, PENNSYLVANIA.

MOWING-MACHINE.

1,348,685.   Specification of Letters Patent.   Patented Aug. 3, 1920.

Application filed October 24, 1919. Serial No. 333,047.

*To all whom it may concern:*

Be it known that I, MARMADUKE H. P. ARCHER, a citizen of the United States, residing at Conshohocken, in the county of Montgomery and State of Pennsylvania, have invented new and useful Improvements in Mowing-Machines, of which the following is a specification.

The invention relates to mowing machines and it has more particular reference to that type of mower which is combined with an automobile tractor or similar power driven machine.

The main object of this invention is to provide a compact and efficient power driven mowing machine fitted with means whereby all necessary relative movements of the various parts to accommodate the varying conditions of the ground traversed by said machine are placed within the immediate reach and under the control of the operator.

A further object of this invention is to provide a mowing machine of the character referred to which is furnished with a novel means for supporting and controlling the sickle or cutter frame as well as means for raising and lowering the same from operative to inoperative position and vice versa.

Another object of the invention comprehends improved means for transmitting the proper reciprocatory motion to the cutting mechanism.

Still further the invention has for an object to provide a neat and compact mowing machine adapted for operation more conveniently by a "Ford" motor.

With the foregoing general and other objects in view which will be more apparent as the description proceeds, this invention consists essentially in the novel features of construction, combination and arrangement of parts hereinafter fully described and more specifically defined by the appended claims.

In the further disclosure of the invention reference is to be had to the accompanying sheets of explanatory drawings illustrative of one practical embodiment thereof, said drawings constituting a part of this specification and in which similar or like parts are designated by the same characters of reference throughout the several views.

Figure 1—is a top plan view of a mowing machine embodying my present improvements.

Fig. 2—is an enlarged sectional view through the cutting frame and blade and taken approximately on the line 2—2 in Fig. 1.

Fig. 3—is a section taken approximately on the line 3—3 in Fig. 2.

Fig. 4—is a detail perspective view of one of the blade holding elements proper.

Fig. 5—is a side elevation of the mowing machine with the cutter frame and blade removed for ease in illustration.

Fig. 6—is a rear elevation of the mowing machine looking toward the right hand in Fig. 5.

Fig. 7—is a fragmentary perspective detail of a supporting bracket hereinafter more particularly referred to; and Fig. 8—is a fragmentary detail perspective view of the cutter frame supporting shoe and its connected parts.

Referring more particularly to the drawings the numeral 10, designates the chassis of the mowing machine 11, 11, the front wheels and 12, 12, the rear wheels thereof, said front wheels being actuated for steering purposes by means of the usual connecting link or rod 13, knuckle 14, steering shaft 15, and steering wheel 16. Transversely of the chassis 10, I rigidly secure cross beams 17, 18, the former of which 17, serves in conjunction with the front end 10ª of the chassis to constitute a substantial bed for the motor 19, which is conveniently of the "Ford" type, and the latter beam 18 supports an appropriate standard 20, on which is secured the seat 21 for the operator, a brace 22 being connected from the back of said seat to the rear part 10ᵇ of the chassis.

23 designates the main or drive shaft from the motor 19, which connects with the rear axle 24 through the customary differential gears 25 and at a convenient position on the drive shaft 23, I securely key or otherwise mount a bevel gear 26, in turn meshing with a miter gear 27, integral with a sleeve 28, under the action of a compression spring 29 and adapted to be moved out of mesh with the bevel gear 26, by means of a hand-lever 30, carried by a bracket 31, mounted on the cross beam 18. This hand lever 30 serves as hereafter explained, to control the starting and stopping of the cutter blade. The miter wheel 27, is slidable longitudinally on a revoluble shaft 32, supported in bearings 33 supported from the cross beam 18 above referred to, and said shaft 30 has secured on its outer end a miter gear 34 in mesh with a bevel gear 35 on the rear end of a counter shaft 36, supported in pendant bearings 37 carried by the underframe of the machine. Keyed or otherwise attached to the forward end of the counter shaft 36, is a crank disk 38 to which is pivoted one end of a connecting rod 39 the other end whereof is hingedly connected at 40 to an upstanding lug 41, integral with the one end of the cutter blade 42.

This cutter blade 42 is reciprocable longitudinally of the cutter frame 43 and said frame includes a series of spaced prongs or fingers 44 furnished with overhanging parts 44ª which serve to keep the cutter-blade 42, properly positioned for effective mowing, and the cutter frame 43 is provided at its outward end with the usual turn-board 45, and turn-rod 46.

In order to provide a means for supporting the inner end of the cutter frame 43, I form thereon a shoe 47 which is of appropriate shape and dimensions to ride smoothly over the surface of the ground, and said shoe is formed with upstanding flanges 48, between which is pivoted an inverted U-shaped member 49, to which is connected the cranked end 50 of a horizontally disposed rod 51, supported by a slotted link 52, from a transverse rod 53 carried by the chassis 10. It is also to be here noted that the rod 51, is supported at its free end by a second movable link 54 pivoted to the chassis, and in order to provide a means for rocking the rod 51, to swing the forward end of the shoe 47 upward to vary the "cut" made by the blade relative to the ground I connect to said rod 51 a hand lever 55, which is pivoted at 56 on a cross shaft or rod 57 journaled in bearings 58 on the chassis 10.

59 indicates a quadrant and 60, a spring influenced latch mechanism for locking the hand lever 55 where desired and at the same time controlling the inclination of the shoe 48, and thereby regulating the "cut" of the mowing blade 42.

The means for raising or lowering the cutter-frame 43 when passing an obstruction, or folding it upwardly out of the way when the machine is not in use, comprises a cranked lever 61, pivoted at 62, to a depending bracket 63 securely fixed beneath the chassis 10 and having one of its arms pivotally connected at 64 to the rear flange 48 of the aforesaid shoe 47, the other arm 65 of said cranked lever being slotted at 66 for operative engagement with a pin or stud 67 projecting from the turned down arm 68, of a second cranked lever 69 pivotally connected at 70, to a laterally projecting arm 71, of the bracket 63. The other arm of the last mentioned cranked lever 69, is formed with upturned spaced ears 72 between which is hingedly connected the lower end of a hand lever 73, conveniently pivoted at 74 on the aforesaid cross rod or shaft 57, a quadrant 75 and latch mechanism 76 being associated therewith to lock the cutter-frame 43 at the desired inclination, or in the out-of-the-way position. Thus it will be readily seen that when the machine is in operation the mowing appliance or cutter frame 43 projects laterally beyond the side of said machine and that it is suspended and supported close to the ground, or at a determined height therefrom, for cutting standard grain, forage and other similar growths on the surface over which the mowing machine is driven.

From the foregoing description and a careful examination of the drawings it will be readily apparent to those skilled in the art to which my invention appertains that I provide an efficient construction and arrangement of power driven mowing machine, as said machine can be transported under its own power to the scene of operation and when there, by moving the hand lever 73 over the quadrant 75 the cutter frame 43, can be lowered to the ground and the height of the cutter-blade 42 adjusted by the lever 55, whereupon by throwing the miter gear 27 into mesh with the bevel gear 26, the machine will be ready for actual mowing purposes by causing the blade 42 to be reciprocated as hereinbefore described. The machine can now be traversed over the area to be mowed under its own power while the operator can promptly manipulate the inclination of the shoe 47 to accommodate varying undulations in the ground surface or for different "cuts." Furthermore it will be apparent that the drive mechanism described constitutes an effective drive arrangement for reciprocating the cutter blade 42 while all the various parts are so disposed as to be under the immediate control of the operator when seated on the machine so that when obstructions are encountered, or it is necessary to change the inclination or height of the cutter blade, such changes can be promptly accomplished without shutting off the motor or stopping the machine.

Still further I wish it to be clearly understood that while I have shown and described my invention as best known to me at the present time, variations in the construction and arrangement of the several parts as well as other combinations thereof may be resorted to for its adaptation to different uses, without in any sense departing from the spirit and scope thereof as defined more specifically by the appended claims.

Having thus described my invention what I claim as new and desire to secure by Letters Patent, is—

1. The combination with a power mowing machine and the drive shaft therefor, of a mowing attachment supported by and adapted to project laterally from one side of the machine, a cutter frame, a shoe on the inner end of the cutter frame, means for operating the cutter of the mowing attachment including a connecting rod and crank mechanism and means for starting and stopping the same, a crank arm associated with and operatively connected to the shoe and means for moving said crank arm to swing the shoe and mowing attachment arcuately up or down relative to the surface over which it is moved, a cranked lever pivotally mounted beneath the machine and having operative connection with the shoe and a bell-crank lever operatively connected to the cranked lever and adapted for actuation by a hand lever to accomplish the raising and lowering of the mowing attachment out of and into operative position.

2. A mowing machine comprising in combination, a chassis having traction wheels thereunder, a motor and associated mechanism for propelling and steering said mowing machine, a mowing mechanism supported by and adapted to project laterally from one side of the machine, a cutter frame, a shoe integral with the cutter frame proper and having an inverted U-shaped pivotal member, means for operating the mowing mechanism including a connecting-rod and crank and means for throwing said crank and connecting rod into and out of operative connection with the drive shaft of the machine, a crank arm operatively connected to the aforesaid inverted U-shaped pivotal member and manually actuated controlling mechanism for moving said crank arm to swing the shoe and mowing attachment arcuately up or down relative to the surface over which it is traversed, a cranked lever pivotally mounted beneath the chassis and having operative connection with an upstanding flange on the shoe, a bell-crank lever movably attached to the aforesaid cranked lever, and means for rocking the bell-crank lever to impart swinging movement to the cranked lever whereby the raising and lowering of the mowing attachment out of and into operative position is accomplished.

In testimony whereof I affix my signature.

MARMADUKE H. P. ARCHER.